United States Patent Office 2,823,242
Patented Feb. 11, 1958

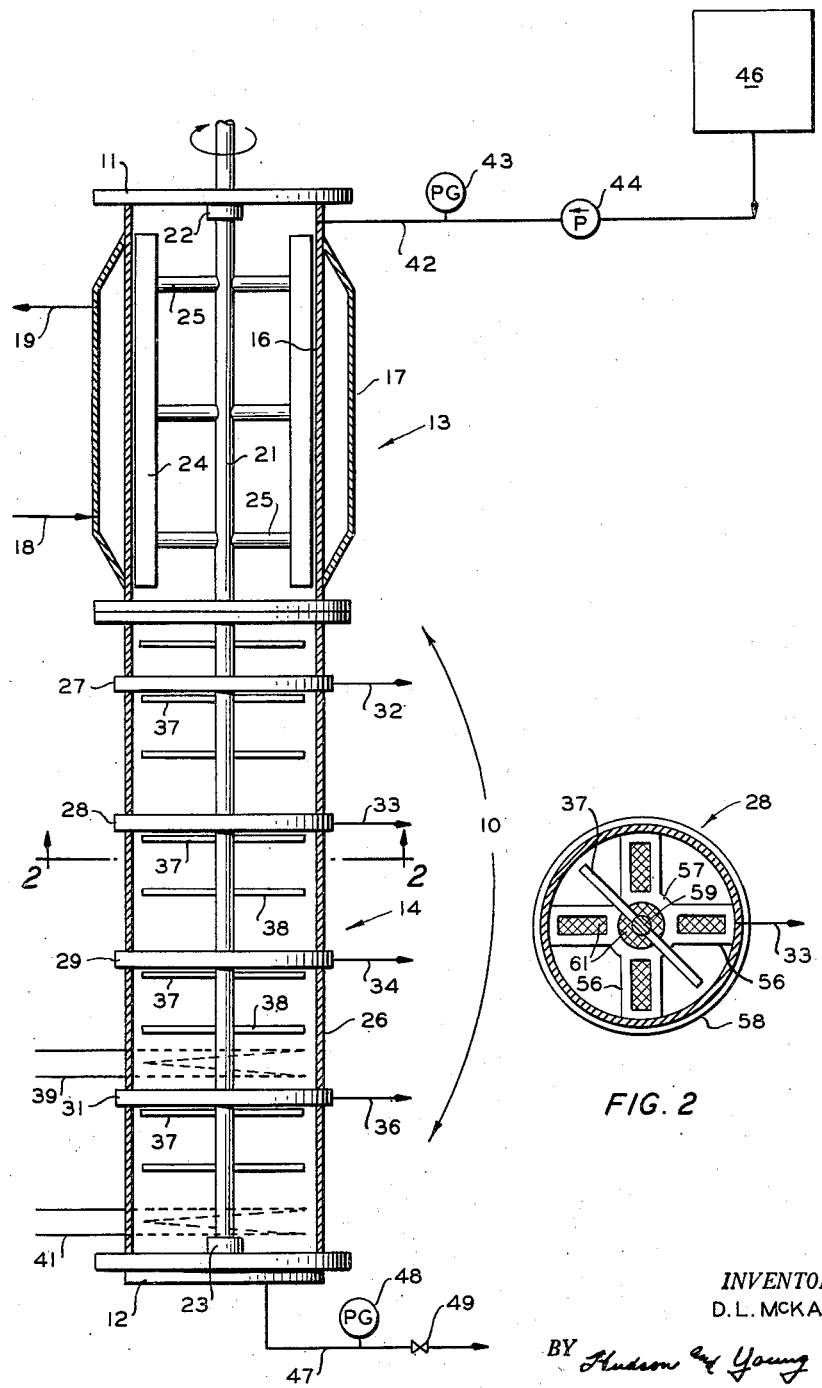

2,823,242

PROCESS AND APPARATUS FOR CRYSTAL PURIFICATION AND SEPARATION

Dwight L. McKay, Bartlesville, Okla., assignor to Phillips Petroleum Company, a corporation of Delaware Application September 8, 1953, Serial No. 378,859

3 Claims. (Cl. 260—676)

This invention relates to crystal purification and separation from liquid mixtures. In one of its more specific aspects, it relates to the separation and purification of liquid multi-component mixtures by fractional crystallization. In another of its more specific aspects, it relates to the separation and purification of a multi-component mixture containing components which form a eutectic. In still another of its more specific aspects, it relates to a process and apparatus for the separation and purification of single component crystals and a mixture of solid phases formed on cooling a liquid multi-component mixture to at least the eutectic temperature.

Since crystals separating from a solution are presumed to have a definite composition, it is possible theoretically by fractional crystallization to produce a pure product from a liquid multi-component mixture. In actual practice of crystallization processes, however, it has been found that the crystals obtained from a solution of several components are impure because of the occlusion of mother liquor within the crystal interstices. In the conventional fractional crystallization processes, the crystal yield from one batch crystallization is redissolved in a solvent or remelted and again crystallized to effect further purification. Since the concentration of impurity in the new liquid is less than in the previous liquor of crystallization, the recrystallized product will contain less impurity. In addition to requiring a large amount of equipment and floor space for their operation with correspondingly high operating expenditures in terms of labor and equipment costs, the conventional types of crystallization processes are limited as to the purity of product obtainable by the number of stages through which the crystallization is carried.

Recently, a continuous process for separating and purifying liquid multi-component mixtures has been disclosed by J. Schmidt in U. S. Patent No. 2,617,274 which overcomes the disadvantages of the conventional fractional crystallization methods. This process involves cooling a liquid multi-component mixture from which the separation is to be made so as to form crystals of at least the higher melting component and thereafter separating them from the mother liquor. The crystals are then introduced into a purification column in one end of which a melting zone is maintained. By mechanical means, the crystals are moved in a compact, contiguous mass toward the melting zone in the purification column where the crystals are melted. A portion of the melt is withdrawn as product while the remainder is displaced as a reflux stream countercurrently to the movement of crystals and in intimate contact therewith so as to remove therefrom occluded impurities. The high purity of product obtainable is due primarily to the washing action of the reflux stream passing through the purification column countercurrent to the movement of crystals. Other systems which utilize a displaced reflux stream and thereby obtain a high purity product are disclosed by P. M. Arnold in U. S. Patent No. 2,540,977 and in my co-pending U. S. application, Serial No. 375,850, filed August 24, 1953.

While the above described process is very effective in producing a high purity product, it may be desirable in some instances to obtain at the same time a product of intermediate purity. In accordance with the present invention, it is possible to recover a product of high purity while also obtaining a product sufficiently pure to meet certain commercial standards.

The following objects will be attained by the various aspects of the invention.

It is an object of the present invention to provide an improved continuous process for the separation and purification of multi-component mixtures.

Another object is to provide an improved process and apparatus for crystal separation from liquid mixtures.

Still another object is to provide a process for the separation and purification of a liquid multi-component mixture containing components which form a eutectic.

A further object is to provide a process and apparatus for the separation and purification of single component crystals and a mixture of solid phases formed on cooling a liquid multi-component mixture to at least the eutectic temperature.

A still further object is to provide a process for the separation and purification of a liquid multi-component mixture whereby a high purity product and a product of intermediate purity are obtained.

Still other objects and advantages will become apparent to those skilled in the art from the following disclosure.

Broadly speaking, the present invention is directed to a process for the separation of a multi-component mixture containing components which form a eutectic wherein a mass of crystals formed by cooling such a mixture to at least the eutectic forming temperature is moved through a purification zone into a melting zone. At least a portion of the crystals are melted in the melting zone forming a liquid of eutectic composition which is passed countercurrently through the moving mass of crystals as a reflux stream. A stream comprising liquid of eutectic composition is removed from the purification zone at a point upstream crystalwise from the melting zone as a product of intermediate purity.

In accordance with a more specific aspect of the present invention, a liquid multi-component mixture containing components which form a eutectic is cooled to at least the eutectic forming temperature so as to form a slurry of single component crystals, a mixture of solid phases, and mother liquor. The mixture of solid phases refers to and comprises the crystals which form at the eutectic temperature and which when melted form a liquid of eutectic composition. For convenience, the term "solid phases of eutectic composition" will be used hereinafter to designate the mixture of solid phases as distinguished from the higher melting single component crystals which separate first upon cooling the liquid mixture. The slurry is introduced into an upright elongated purification column provided with a series of filters, a first heat exchange means in an intermediate section of the column, and a second heat exchange means in the downstream end of the column with respect to crystal flow. Mother liquor is withdrawn from the column through a first filter so as to form a uniform, contiguous mass of crystals which is moved into a first melting zone maintained by the first heat exchange means at a temperature between the eutectic temperature and the melting point of the single component crystals. At least a portion of the solid phases of eutectic composition is melted in the first melting zone, and the resulting melt is displaced countercurrently to the movement of crystals so as to wash occluded impurities therefrom. A eutectic stream is removed as a product of intermediate purity from the column through a filter disposed upstream crystalwise from the first melting zone while a stream comprising mother liquor and eutectic is withdrawn through a filter positioned upstream crystalwise from the last mentioned filter. The single component crystals move through the first melting zone and into a second melting zone maintained by the second heat exchange means at a temperature at least as high as the melting point of the single component crystals. At least a portion of the single component crystals is melted in the second melting zone, and a part of the resulting melt is displaced countercurrently to the movement of crystals so as to wash occluded impurities therefrom. A stream comprising the eutectic and the liquid resulting from melting the single component crystals is withdrawn from the column through a filter disposed downstream crystalwise from the first heat exchange means. A pure product in the form of melt or as a mixture of melt and single component crystals is withdrawn from the second melting zone.

The fractional crystallization apparatus and process of this invention are applicable to the separation and purification of any multi-component mixture containing components which form a eutectic and wherein it is desired to obtain a product of intermediate purity. The invention is particularly applicable to the separation of normal paraffins from a mixture containing normal paraffins and other hydrocarbons. Thus, it has been found that by cooling a mixture of hydrocarbons containing normal paraffins to below the crystal forming temperature of the normal paraffins, solid phases of eutectic composition are formed which can be melted and recovered as a commercial grade normal paraffin stream while at the same time recovering high purity normal paraffins.

For a more complete understanding of the invention, reference may be had to the drawing, in which:

Figure 1 is a diagrammatic elevational view, partly in section, of an arrangement of apparatus suitable for practicing the invention; and Figure 2 is a sectional view taken along line 2—2 of Figure 1.

Referring to Figure 1 of the drawing, an upright elongated column 10 is provided with upper and lower closure members 11 and 12, respectively, and is divided into two principal sections, namely, scraped surface chiller 13 and crystal purification column 14. Scraped surface chiller 13 comprises a tubular member 16 surrounded by a refrigeration means such as annular jacket 17 provided with refrigerant inlet line 18 and refrigerant outlet line 19 by means of which refrigerant is introduced into and withdrawn from the annular space between tubular member 16 and jacket 17. Shaft 21 centrally disposed within column 10 is supported by means of upper and lower bearings 22 and 23, respectively. A plurality of scraper blades 24, attached to vertical shaft 21 by cross members 25, are positioned in close proximity to the walls of tubular member 16 and extend longitudinally throughout the length of jacket 17. It is within the scope of the invention to utilize a helical ribbon scraper with the chiller in which case rotation of the scraper will aid in moving the crystal slurry from the chiller into the crystal purification column and concomitantly the movement of crystals through the column.

Crystal purification column 14, disposed immediately below scraped surface chiller 13 and connected thereto, comprises vertical pipe 26 closed at its lower end by closure member 12. A series of four filters, namely, 27, 28, 29 and 31, are disposed within column 14, each of the filters being provided with liquid outlet lines 32, 33, 34 and 36, respectively. Scraper blades 37, attached to shaft 21, are positioned in close proximity to the bottom part of each of the filters. A plurality of stirring means such as radial rods 38 or blades are affixed in spaced relation to that portion of shaft 21 disposed within column 14. A first heat exchange means 39 is disposed above filter 31 in an intermediate section of column 14 while a second heat exchange means 41 is positioned in the lower end of the column. As illustrated, the heat exchange means comprises coils, positioned within the column, through which a heat transfer medium is circulated. It is to be understood that other suitable heat exchange means can be used, e. g., coils can be disposed around the column, or electrical bayonet type heaters may be provided to extend into the purification column.

Shaft 21 extends through upper closure member 11 and is operatively connected to a motor, not shown. The rotation of shaft 21 turns scraper blades 24, filter scraper blades 37 and stirrer rods 38 within scraped surface chiller 13 and crystal purification column 14.

Feed inlet line 42, communicating with the upper end of tubular member 16 and containing a pressure gage 43 and feed pump 44, is connected to a source 46 of feed material. Outlet line 47, connected to the lower end of column 14 and containing pressure gage 48 and valve 49, provides means for withdrawing a controlled amount of higher melting product from the column.

Referring to Figure 2 of the drawing, there is illustrated one of the filters which are disposed within column 14. The filter comprises a plurality of radial members 56 extending from hub 57 to header 58. Hub 57 is provided with an opening 59 through which shaft 21 of Figure 1 rotates. The lower portions of radial members 56 and hub 57 contain openings covered with screening 61, and scraper blade 37 attached to shaft 21 is positioned in close proximity to the screening. Liquid outlet line 33 connected to header 58 provides means for withdrawing liquid from column 14 through filter 28. It is not intended to limit the invention to the specific filter shown, for any type of filter which permits crystals to move past the filter into the downstream end of the purification column and also allows scraping of the filter screen can be utilized. Accordingly, a filter made up of a plurality of annular ring members, a criss-cross arrangement of tubular members, or the like can be advantageously employed.

While the fractional crystallization apparatus of this invention has been described and illustrated as comprising a substantially vertical cylindrical column of uniform cross-section, it is not intended to so limit the invention. Thus, the cross-sectional areas of the chiller and the purification column may be of varying diameters without departing from the spirit or scope of the invention. It is also within the contemplation of the invention to utilize a separate chiller which is disposed in positions other than directly above the purification column. For example, a horizontal chiller provided with a helix or screw for moving a slurry of crystals and mother liquid into the purification column can be employed. It is also within the scope of the present invention to provide a displacement means such as a piston or auger for moving the crystal mass through the purification column in which case the column can be disposed in positions other than the vertical as illustrated, e. g., a horizontal position.

In the operation of the apparatus of Figure 1, a liquid multi-component feed mixture from source 46, containing components which form a eutectic, is introduced through line 42 into scraped surface chiller 13 under hydraulic pressure developed by feed pump 44. Refrigerant is passed into the annular space between tubular member 16 and jacket 17 at a rate sufficient to maintain scraped surface chiller at a temperature low enough to crystallize the eutectic. The feed mixture fills the entire length of elongated column 10, and a superatmospheric pressure is maintained at the top of chiller 13 through the operation of pump 44. Because of the low chiller temperature, single component crystals and solid phases of eutectic composition are frozen out, thus forming a slurry of crystals and mother liquor. Shaft 21 is slowly rotated so that scraper blades 24 remove any crystals forming on the walls of tubular member 16.

The slurry of crystals and mother liquor flows downwardly through chiller 13 and enters crystal purification column 14. The crystals are separated from the slurry by means of filter 27 disposed in the upper portion of column 14, and mother liquor is withdrawn from the column through line 32. A uniform, contiguous mass of crystals formed upon removal of the mother liquor is thereafter moved downwardly through column 14, by the combination of the force of gravity and the hydraulic force exerted by the liquid moving downwardly in the column, into a first melting zone maintained by first heat exchange means 39 at a temperature between the eutectic forming temperature and the melting point of the single component crystals. The solid phases of eutectic composition are melted in the first melting zone, and the resulting melt is displaced countercurrently to the downward movement of crystals so as to wash occluded impurities therefrom. A stream comprising mother liquor and eutectic is removed from column 14 through filter 28 by means of line 33. A eutectic stream is withdrawn as a product of intermediate purity through filter 29 by means of line 34. The single component crystals move through the first melting zone and into a second melting zone maintained by second heat exchange means 41 at a temperature at least as high as the melting point of the single component crystals. At least a portion of the single component crystals are melted in the second melting zone, and a part of the resulting melt is displaced countercurrently to the downward movement of crystals so as to wash occluded impurities therefrom. A stream comprising the eutectic and the liquid resulting from melting the single component crystals is withdrawn from column 14 through filter 31 by means of line 36. A pure product in the form of melt or as a mixture of melt and single component crystals is withdrawn from the second melting zone through outlet line 47. During the operation of the apparatus, filter scraper blades 37 slowly rotate with shaft 21 so as to prevent crystals from blocking the filter screens. Stirrer rods 38 are also turning with shaft 21, continuously stirring the crystals so as to maintain a uniform mass of crystals and prevent channelling of the displaced liquid by eliminating possible bridging of crystals within the column.

The following illustrative example, which is not intended to be unduly limitative of the invention, will provide a more comprehensive understanding of the invention.

For this example, a fractional crystallization apparatus is utilized which has a scraped surface chiller disposed above a crystal purification column provided with a series of four filters, a first heat exchange means in an intermediate section of the column just above the lowermost filter, and a second heat exchange means in the lower end of the column. A hydrocarbon fraction having a boiling range of 435 to 650° F. and comprising 52.6 percent normal paraffins, 5 to 6 percent aromatics, and the remainder naphthenes and iso-paraffins is pumped into the top of the chiller where the feed mixture is cooled to a temperature sufficiently low to form normal paraffin crystals and solid phases of eutectic composition. The resulting slurry is introduced into the purification column and mother liquor is withdrawn therefrom through the uppermost filter. The crystal mass comprising normal paraffin crystals and solid phases of eutectic composition is moved downwardly into a first melting zone, maintained at a temperature of 28.5° F. by the first heat exchange means, where said solid phases are melted, and the resulting melt is displaced countercurrently to the movement of crystals. A eutectic stream is removed as a product of intermediate purity through a filter positioned above the first melting zone while a stream comprising mother liquor and eutectic is withdrawn through a filter positioned above the last mentioned filter. The normal paraffin crystals move through the first melting zone into a second melting zone maintained at a temperature of 86° F. by the second heat exchange means and are melted therein, the resulting melt being displaced countercurrently to the movement of crystals. A stream comprising normal paraffins and eutectic, which is recovered as a technical grade normal paraffin product, is withdrawn through a filter positioned below the first heat exchange means. The remainder of the liquid resulting from melting the normal paraffin crystals is recovered from the second melting zone as product. A summary of the operating conditions and results is presented in the following table.

| Temperature, ° F. | | | | Composition, Volume Percent | | |
|---|---|---|---|---|---|---|
| Feed | Chiller Exit | First Melting Zone | Second Melting Zone | Feed | Intermediate Purity Stream | High Purity Stream |
| 80 | 22 | 28.5 | 86 | N-Paraffins—52.6<br>Aromatics—5-6 | N-Paraffins—92.1<br>Aromatics—1 | N-Paraffins—98.5.<br>Aromatics—<0.5. |

By carrying out the separation and purification of a liquid multicomponent mixture containing components which form a eutectic in accordance with the present invention, a product of intermediate purity as well as a high purity product can be obtained. It is thus possible to effect a multiple separation and thereby recover more than one product stream in a single operation utilizing a single frictional crystallization apparatus.

As will be evident to those skilled in the art, various modifications of this invention can be made or followed in the light of the foregoing disclosure and discussion without departing from the spirit or scope of the invention.

I claim:

1. A continuous process for the separation of a liquid multi-component mixture containing components which form a eutectic which comprises cooling said mixture to at least the eutectic forming temperature of said eutectic so as to form a slurry of single component crystals, solid phases of eutectic composition and mother liquor; passing said slurry into an elongated purification zone; separating mother liquor from said crystals in a first filter zone so as to form a mass of crystals within said purification zone; moving said mass of crystals into a first melting zone disposed intermediate the ends of said purification zone and maintained at a temperature between the eutectic temperature and the melting point of said single component crystals; melting said solid phases in said first melting zone; passing the resulting melt toward the upstream end crystalwise of said purification zone as a reflux stream through said moving mass of crystals; withdrawing from said purification zone through a second filter zone disposed downstream crystalwise from said first filter zone a stream comprising mother liquor and eutectic; withdrawing from said purification zone through a third filter zone disposed downstream crystalwise from said second filter zone a eutectic stream as a product of intermediate purity; moving the remaining single component crystals into a second melting zone disposed in the downstream end crystalwise of said purification zone and maintained at a temperature at least as high as the melting point of said single component crystals; melting at least a portion of the single component crystals in said second melting zone; passing a portion of the resulting melt toward the upstream end crystalwise of said purification zone; withdrawing from said purification zone through a fourth filter zone disposed downstream crystalwise from said first melting zone a stream comprising melted single component crystals and eutectic; and recovering purified product from said second melting zone.

2. Apparatus for the separation and purification of crystals which comprises, in combination, a crystal purification column; means for introducing crystals into one end of said column; a first means for melting crystals in the opposite end of said column and outlet means for withdrawing melt therefrom; a second means for melting crystals disposed in an intermediate portion of said column; a first filtering means in the upstream end portion crystalwise of said column; a second filtering means positioned downstream crystalwise from said first filtering means and between said first filtering means and said second crystal melting means; a third filtering means disposed between said second filtering means and said second crystal melting means; and a fourth filtering means positioned between said first and second crystal melting means, each said filtering means comprising an annular header member, a plurality of hollow radial arms extending inwardly from said header member, a hollow hub member centrally positioned within said annular header member and attached to the inner ends of said radial arms, one side of said hub member and said radial arms being provided with openings impervious to the flow of solids and pervious to the flow of liquid, and conduit means attached to said header member.

3. The apparatus of claim 2 in which each of said filtering means is provided with means for scraping said openings provided in said hub member and said radial arms.

References Cited in the file of this patent

UNITED STATES PATENTS

| | | |
|---|---|---|
| 2,435,792 | McArdle et al. | Feb. 10, 1948 |
| 2,540,083 | Arnold | Feb. 6, 1951 |
| 2,540,977 | Arnold | Feb. 6, 1951 |
| 2,593,300 | Hachmuth | Apr. 15, 1952 |
| 2,617,274 | Schmidt | Nov. 11, 1952 |
| 2,622,115 | Carney | Dec. 16, 1952 |
| 2,637,749 | Aston et al. | May 5, 1953 |
| 2,651,922 | Graham | Sept. 15, 1953 |